A. H. KELLER.
VEHICLE TIRE.
APPLICATION FILED FEB. 25, 1918.

1,285,730.

Patented Nov. 26, 1918.

WITNESS:
Rob R Kitchel

INVENTOR
Augustus H. Keller
BY
Frank S. Busser
ATTORNEY.

UNITED STATES PATENT OFFICE.

AUGUSTUS H. KELLER, OF PHILADELPHIA, PENNSYLVANIA.

VEHICLE-TIRE.

1,285,730.

Specification of Letters Patent.

Patented Nov. 26, 1918.

Application filed February 25, 1918. Serial No. 218,921.

*To all whom it may concern:*

Be it known that I, AUGUSTUS H. KELLER, a citizen of the United States, residing at Philadelphia, county of Philadelphia, and State of Pennsylvania, have invented a new and useful improvement in Vehicle-Tires, of which the following is a full, clear, and exact description, reference being had to the accompanying drawings, which form a part of this specification.

The object of the invention is to provide a tire for vehicles having sufficient elasticity and resiliency to permit its use on power-driven pleasure vehicles in place of the ordinary pneumatic tire and having also sufficient strength and durability to make them suitable for use on heavier vehicles, such as automobile trucks. Another object is to permit the application of the invention to a standard rim and standard rubber-and-fabric tire or shoe, the invention residing in the expansible and elastic structure which is inserted within the shoe in place of the usual pneumatic inner tube and in the means for holding said structure in expanded position.

A preferred embodiment of the invention is shown in the accompanying drawings, in which—

*a* represents a standard wooden felly; *b* a standard steel rim provided with inturned edges adapted to receive the feet of a standard flexible and elastic shoe *c*.

A series of wire rings extends circumferentially within the shoe adjacent its inner wall. Two of these rings *d* are located between the feet of the shoe and in actual use press against the same. The other rings *e* are located at varying distances around the circumference of the shoe. Preferably, the rings *e* are disposed approximately about that semi-circumference of the cross-section of the shoe adjacent its tread, the distance between adjacent rings *e* being about equal and the distance between adjacent rings *d* and *e* being greater than the distance between adjacent rings *e*. This relative spacing, however, is not essential. Each ring consists of a single wire bent into circular shape, the abutting or approximating ends being secured together by a connecting sleeve *f*. The rings *d* and *e* may each be sheathed in a rubber or other covering *m*.

Connecting the circumferential rings are a number of "expanders" each comprising a set of links *g*. The links of each expander are arranged in the same cross-sectional plane. Each of the links, except the two longer end links, is provided, along its convexly curved longitudinal edge, with a ridge *g'*, this ridge, at opposite end portions of the link, merging into the body of the link adjacent its concaved edge. At the end of each link, except at one end of each longer link, and along the margin of the eye, is a concavity adapted to fit and receive the adjacent eye of the adjacent link. Holding these links from lateral slippage are collars *h* secured to the rings.

Figure 1:
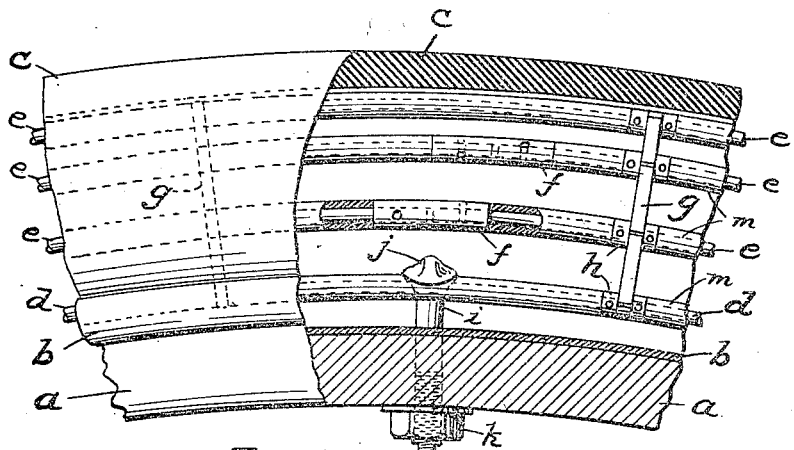
Figure 1 is a longitudinal view of a tire, embodying my invention, partly broken away.
Figure 2:
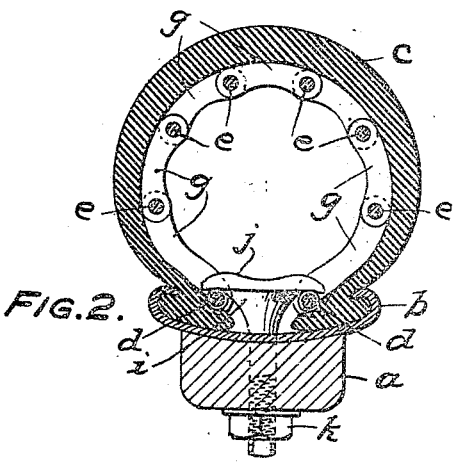
Fig. 2 is a cross-sectional view of the same.
Figure 3:
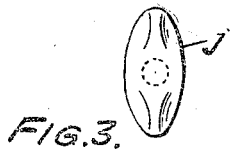
Figs. 3 and 4 are respectively plan and side views of the expansion lug.

Extending loosely through the felly *a* and rim *b* are the shanks of a number of "expansion lugs." There are as many of these expansion lugs as there are expanders, each expansion lug being located about midway between adjacent expanders. The inner end of each expansion lug, where it extends between the two rings *d*, is provided with an oval-shaped cam periphery *i* and with a head *j* of elongated shape whose longer extension is in the direction of the greater diameter of the adjacent cam shaped portion *i* of the shank and at its opposite ends, overhangs the cam portion *i*, so that, when it is in operative position, as shown in Fig. 2, it extends over the rings *d*. The end of the expansion lug projecting inside the wooden felly is screw-threaded to receive a nut *k*.

Figure 4:
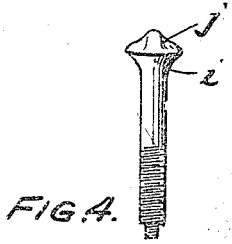
Figure 5:
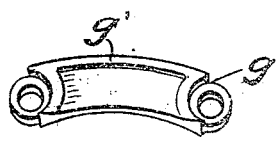
Figs. 5 and 6 are detail perspective views of the short and long links respectively.
Figure 6:
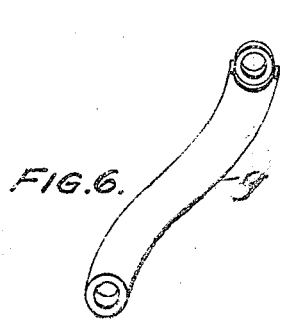

The tire is applied to the wooden felly in the ordinary way, the rings, however, being more or less loose within the tire. The expansion lug at this time is turned about ninety degrees from the position shown in Fig. 2, as shown in Fig. 4, so that the longer diameters of the head *j* and of the cam periphery *i* of each expander extend parallel with the longitudinal direction of extension of the rim, shoe and wires: thus permitting the two rings *d* to approach relatively closely and thereby allowing the expanders to contract. By turning the expansion lugs into the position shown in Fig. 2, the rings *d* are forced, by the cam surfaces *i* of the shanks of the expansion lugs, outwardly away from each other, thereby forcing the expanders against the inner wall of the shoe, the heads $j$ of the expansion lugs moving into position to confine the rings $d$ against the feet of the shoe $c$.

It is obvious that the wire rings $d$, $e$ afford a flexible and elastic internal support for the shoe which yieldingly resists the external pressure against the tread of the tire when the vehicle is in motion, allowing the tire to flatten to about the same extent as occurs when the shoe is provided with an inner air-inflated tube.

Having now fully described my invention, what I claim and protect by Letters Patent is:

1. A vehicle tire comprising a shoe of flexible and elastic material, flexible rings extending circumferentially within the shoe, expanders consisting of links connecting adjacent rings, and means holding said links against the inner wall of the shoe.

2. A vehicle tire comprising a shoe of flexible and elastic material, flexible rings extending circumferentially within the shoe, expanders consisting of links connecting adjacent rings, and means, engaging a plurality of said wires, adapted to force the expanders outwardly against the inner wall of the shoe.

3. A vehicle tire comprising a shoe of flexible and elastic material, a number of flexible rings extending circumferentially within the shoe, two of said rings extending adjacent to the point of attachment of the shoe to the rim, links connecting adjacent rings, and means to force the two last named rings away from each other against the portions of the shoe adjacent thereto, thereby expanding the links and rings.

4. A vehicle tire comprising a shoe of flexible and elastic material, a number of flexible rings extending circumferentially within the shoe, expanders each consisting of a series of links connecting adjacent rings, and expansion devices located along the circumference of the tire between adjacent expanders and operable to move a plurality of said wires in a direction adapted to force the expanders against the inner wall of the shoe.

5. A vehicle tire comprising a shoe of flexible and elastic material, a number of flexible rings extending circumferentially within the shoe, two of said rings extending adjacent to the point of attachment of the shoe to the rim, links connecting adjacent rings, and expansion lugs turnable in said rim, each lug having a cam periphery adapted, when the lug is turned, to spread the two last named rings farther apart and thereby force the links and rings outwardly.

6. A vehicle tire comprising a shoe of flexible and elastic material, a number of flexible rings extending circumferentially within the shoe, two of said rings extending adjacent to the point of attachment of the shoe to the rim, links connecting adjacent rings, and expansion lugs engaging said rim and having heads adapted to confine the two last named rings against the portions of the shoe adjacent thereto.

7. A vehicle tire comprising a shoe of flexible and elastic material, a number of flexible rings extending circumferentially within the shoe, two of said rings extending adjacent to the point of attachment of the shoe to the rim, links connecting adjacent rings, and expansion lugs each comprising a shank extending radially through the rim and an elongated head within the shoe, the shank of the lug adjacent the head having a variable diameter to cause the shank, when turned, to force the two last named rings away from each other in opposite directions, the ends of the head overhanging the part of the shank of greater diameter and adapted to confine the two last named rings against the shoe when the rings are thus spread apart, thereby expanding all the links against the inner wall of the shoe and holding them in yielding contact therewith.

In testimony of which invention, I have hereunto set my hand, at Philadelphia, Pa., on this 21st day of February, 1918.

AUGUSTUS H. KELLER.